Nov. 29, 1966  H. LAMM ET AL  3,288,120

ROTARY PISTON INTERNAL COMBUSTION ENGINE

Filed Nov. 20, 1964

INVENTOR.
HEINZ LAMM
LOTHAR KORTNER
HANS-OTTO DERNDINGER

Dicke & Craig

BY  ATTORNEYS.

United States Patent Office 3,288,120
Patented Nov. 29, 1966

3,288,120
ROTARY PISTON INTERNAL COMBUSTION
ENGINE
Heinz Lamm and Lothar Kortner, Stuttgart-Bad, and
Hans-Otto Derndinger, Stuttgart-Wangen, Germany, assignors to Daimler-Benz Aktiengesellschaft, Stuttgart-Unterturkheim, Germany
Filed Nov. 20, 1964, Ser. No. 412,660
Claims priority, application Germany, Nov. 22, 1963,
D 42,993
14 Claims. (Cl. 123—8)

The present invention relates to a rotary piston-internal combustion engine, especially of trochoidal construction, in which a polygonal piston provided with piston recesses in the flanks thereof is rotatably supported within a housing having lateral parts and a casing with a multi-arched internal casing surface, which is provided with zones close to the engine axis, on the eccentric of an eccentric shaft, which piston during the movement thereof relative to the enclosure body and to the eccentric shaft slides with the corners thereof along the internal casing surface and thereby controls the gas exchange channels arranged within one zone close to or approaching the engine axis.

With rotary piston internal combustion engines, especially of trochoidal construction, a good mixture preparation is necessary for achieving an acceptable specific fuel consumption value, which in turn is considerably enhanced by the production of long-lasting vortexing or eddying of the combustion air and/or of the fuel-air mixture. Accordingly, the present invention aims at so constructing a rotary piston internal combustion engine with the least possible structural expenditures that eddying or vortexing motions are produced by the movement of the piston which are maintained up to the ignition moment, and that a compact combustion space results in which, for example, with a gasoline injection system, a concentration of the injected fuel is possible for the attainment of a stratification of the fuel-air mixture. In solution of the underlying problems and proposed aims, the present invention essentially consists in that the piston trough or recess in each piston flank is of essentially axially symmetrical construction and an inlet groove is connected tangentially to the piston recess which in relation to the direction of rotation of the piston begins within the area of the trailing piston corner and whose depth, which increases continuously from the beginning thereof within the area of the trailing piston corner, corresponds at the connection with the piston recess to the depth of the piston recess.

A large part of the combustion air or fuel-air mixture flowing into the suction space of the internal combustion engine during the suction stroke is guided directly by the inflow or inlet groove into the piston recess, where the combustion air or the fuel-air mixture carries out a circular movement in the piston recess by reason of the tangential connection of the inlet groove with the piston recess. The vortex or eddy is fed continuously during the suction phase so that it is maintained advantageously up to and into the compression stroke. Additionally, there is advantageously achieved by the arrangement of the inlet groove of the present invention that after the ignition at the beginning of the expansion phase a throttle-free connection is established by this inlet groove between the leading and the trailing combustion spaces above the piston flank which is favorable for a good combustion process.

The circular or rotating movement of the air or of the fuel-air mixture in the piston recess can be enhanced according to a further feature of the present invention in that a cone-shaped or mushroom-shaped raised portion or projection is arranged concentrically within the piston recess whose highest point extends up to within the plane of the piston flank. In the case of the injection of fuel, the fuel may be directed against this raised portion or projection so that it is distributed in a favorable manner and is seized by the vortex or eddy in the piston recess. The raised portion or projection can also be utilized simultaneously in the manner of an evaporator plate.

According to another feature of the present invention, a groove may be connected tangentially to the piston recess at the side opposite the inlet groove which in relation to the direction of rotation of the piston leads to the leading piston corner. Particularly during the last phase of the compression stroke, combustion air or fuel-air mixture flows into the piston recess through this groove in a direction opposite to the direction of rotation of the piston so that the vortexing or eddying fed by the inlet groove receives within the piston recess a considerable assist in its circular or rotating movement.

The piston recess may be further arranged in the piston flank eccentrically with respect to the axial direction of the piston and/or eccentrically with respect to the direction of rotation of the piston.

Accordingly, it is an object of the present invention to provide a rotary piston internal combustion engine, especially of trochoidal construction, which assures by extremely simple means a good mixture preparation and therewith a good fuel consumption.

Another object of the present invention resides in the provision of a rotary piston internal combustion engine in which the piston is so constructed and arranged as to produce a long lasting vortexing of the combustion air and/or fuel-air mixture.

Still another object of the present invention resides in the provision of a rotary piston internal combustion engine which achieves the aforementioned aims and objects by the least possible structural expenditures combined with ease of manufacture without involving large costs.

Still a further object of the present invention resides in the provision of a rotary piston internal combustion engine provided with a polygonal piston whose piston is provided with piston recess means cooperating with the housing in such a manner as to assure a vortexing of the combustion air and/or fuel-air mixture that lasts at least up to the ignition moment.

Another object of the present invention resides in the provision of a rotary piston internal combustion engine having a compact combustion space which permits by simple means a stratification of the fuel air mixture.

A further object of the present invention resides in the provision of a polygonal piston for rotary piston internal combustion engines of trochoidal construction provided with a piston recess of such configuration as to assure vortexing of the combustion air and/or combustion airfuel mixture that not only lasts through the entire suction stroke but continues into the compression stroke while at the same time establishing a substantially throttle-free communication between the leading and the trailing combustion space portions during the expansion phase.

A still further object of the present invention resides in the provision of a rotary piston internal combustion engine which permits a particularly advantageous fuel injection assuring good distribution and mixture preparation of the engine.

These and further objects and advantages of the present invention will become more obvious from the following description when taken in connection with the accompanying drawing which shows, for purposes of illustration only, several embodiments in accordance with the present invention, and wherein FIGURE 1 is a schematic cross sectional view, perpendicularly to the axis of the engine, through a rotary piston internal combustion engine of trochoidal construction in accordance with the present invention.

Figure 1:
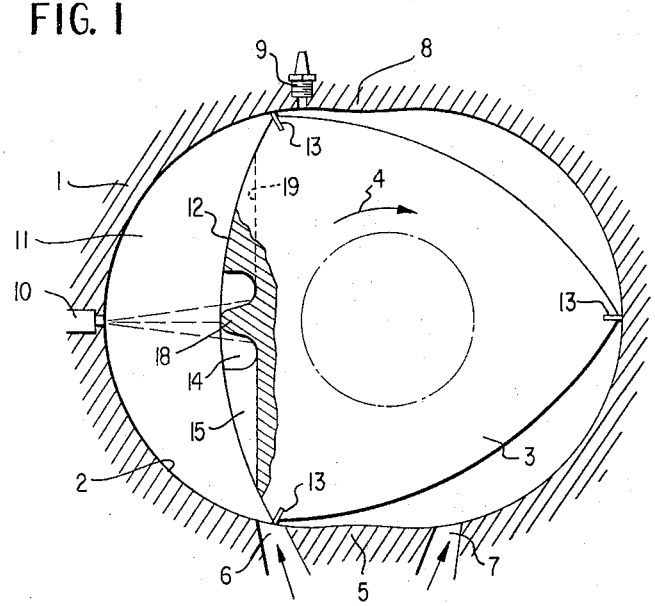

Referring now to the drawing wherein like reference numerals are used throughout the various views to designate like parts, and more particularly to FIGURE 1, the rotary piston internal combustion engine of trochoidal construction illustrated therein comprises a casing 1 having a two-arched internal casing surface 2. The triangular piston 3 rotates within the casing 1 in the direction of the arrow 4 on the eccentric of an eccentric shaft (not shown). The inlet channel 6 and the outlet channel 7, to be referred to hereinafter as the gas exchange channels, are arranged in the casing 1 within the area of the internal surface zone 5 close to or approaching the axis of the engine. The spark plug 9 is disposed within the area of the opposite internal surface zone 8 close to or approaching the axis of the engine. The injection nozzle 10 is disposed in the casing 1 between the two zones 5 and 8 close to the axis; fuel is injected through a nozzle 10 during the suction stroke transversely through the suction space 11 against a piston flank 12 when the piston 3 or respective piston flank 12 assumes the position thereof illustrated in FIGURE 1. A sealing of the piston 3 against the internal casing surface 2 takes place by conventional sealing bars or vanes 13 arranged at the corners of the piston 3. Separate conventional seals establish a seal for the gas and oil in the axial direction in conjunction with the lateral parts of the housing of the engine.

In order that a good mixture preparation occurs in the internal combustion engine, an approximately axially symmetrical piston trough or recess 14 is arranged in each piston flank 12 with which is tangentially connected an inlet or inflow groove 15. As can be seen from FIGURE 2, the inlet groove 15 begins in the area of the trailing piston corner and becomes continuously deeper up to the piston recess 14 so that the groove 15 at the tangential termination or discharge into the piston recess 14 has the depth of the recess 14. The inlet groove 15 is relatively wide at the beginning thereof within the area of the trailing piston corner and the width of the inlet groove 15 continuously decreases up to the piston recess 14.

Combustion air flowing during the suction stroke through the inlet channel 6 into the suction space 11 of the internal combustion engine is guided by the inlet groove 15 in the direction of arrow 16 into the piston recess 14 where it carries out a circular eddying or rotating vortexing movement in the direction of arrow 17 by reason of the tangential connection of the inlet groove. This vortexing movement in the direction of arrow 17 is enhanced by the raised portion or projection 18 arranged concentrically in the piston recess 14, against which in the case of the fuel injection illustrated in FIGURE 1, is directed the fuel jet through the inlet nozzle 10 so that the fuel, evenly distributed about 360°, is able to mix with the combustion air rotating in the direction of arrow 17.

The groove 19 is further tangentially connected with the piston recess 14 at the side thereof opposite the inlet groove 15. The groove 19 extends up to within the area of the leading piston corner. At the connection of this groove 19 with the piston recess 14 the groove 19 also has the same depth as the piston recess 14. The groove 19 becomes increasingly more flat or shallow from the connection thereof up to the leading piston corner.

If the piston 3 during the compression stroke is with its piston flank 12 in such a position that the leading part of the piston flank 12 approaches the internal casing surface 2 of the casing 1 within the area of the zone 8 close to the axis, the combustion air displaced by the leading part of the piston flank 12 is squeezed into the groove 19 so that it flows into the piston recess 14 in the direction of arrow 20 and considerably aids therein the rotating movement of the combustion air in the direction of the arrow 17.

Figure 2:
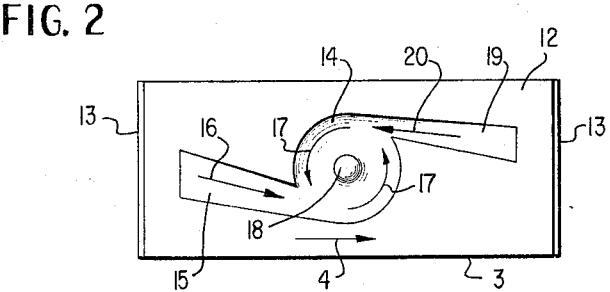
FIGURE 2 is a plan view on a piston flank of the rotary piston for the rotary piston internal combustion engine of FIGURE 1.

The inlet groove 15 begins in FIGURE 2 within the area of the trailing piston corner in the center of the piston 3 and extends obliquely toward the piston recess 14. The intended effect can, of course, also be achieved in accordance with the present invention, if the inlet groove 15 extends parallel to the axial end wall of the piston 3. Furthermore, the groove 19 can also be disposed at an inclination or parallel to the piston end wall.

Figure 3:
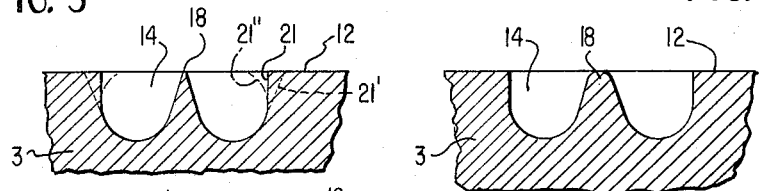
FIGURES 3, 3a and 3b are partial cross sectional views, on an enlarged scale, through the piston flanks, of the rotary piston of FIGURE 1 illustrating three different constructions of the piston recess.
Figure 3A:
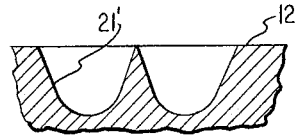
Figure 3B:
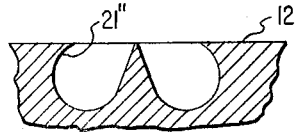
Figure 4:
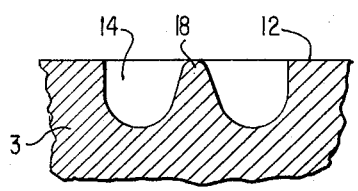
FIGURE 4 is a partial cross sectional view, similar to FIGURE 3, illustrating a modified embodiment of a piston recess in accordance with the present invention.

Various embodiments are feasible within the scope of the present invention for the realization of the raised portion or projection 18 in the piston recess. According to FIGURES 3, 3a and 3b, the raised portion 18 may be constructed with a sharp point, that is, with a point forming an acute angle. In the embodiment of FIGURE 4, the raised portion of projection 18 is constructed rounded off.

Dependent on whether the air eddy or vortex, which rotates within the piston recess 14 in the direction of arrows 17, is to be kept in the piston recess 14 or whether this air eddy or vortex is to leave more or less strongly the piston recess 14, the circumferential wall 21 of the piston recess 14 may be constructed correspondingly. In FIGURE 3, the circumferential walls 21 permit to the air eddy or vortex to leave the piston recess slightly. In FIGURE 3a the shape of the circumferential walls 21' permit that the air eddy or vortex, for the largest part, is able to leave the piston recess 14. In FIGURE 3b the form of the circumferential walls 21" practically prevents the air eddy or vortex from leaving the piston recess 14.

Of course, FIGURES 3a and 3b may also be provided with projections 18 as shown in FIGURE 4.

While we have shown and described several embodiments in accordance with the present invention, it is understood that the same is not limited thereto but is susceptible of numerous changes and modifications as known to a person skilled in the art and we therefore do not wish to be limited to the details shown and described herein but intend to cover all such changes and modifications as are encompassed by the scope of the appended claims.

We claim:

1. A rotary piston internal combustion engine, especially of trochoidal construction, comprising:

housing means having lateral housing parts and casing means provided with multi-arched internal surfaces forming zones in proximity to the axis of the engine, eccentric shaft means having eccentric means, polygonal piston means rotatably supported on said eccentric means and provided with piston recess means in the piston flanks thereof, said housing means being provided within one of said zones with gas exchange channel means, said piston means during movement thereof relative to said casing means and to the eccentric shaft means sliding with the corners thereof along the inner casing surfaces and thereby valving said gas exchange channel means, the piston recess means in each piston flank having circular wall means, and inlet groove means in a respective piston flank tangentially connected with the said circular wall means of the corresponding piston recess means, said inlet groove means beginning in relation to the direction of rotation of the piston means within the area of the trailing piston corner and having a depth increasing continuously from the beginning thereof toward the recess means and corresponding substantially to the depth of the piston recess means at the place of connection therewith.

2. A rotary piston internal combustion engine, especially of trochoidal construction, comprising:

housing means having lateral housing parts and casing means provided with multi-arched internal surfaces forming zones in proximity to the axis of the engine, eccentric shaft means having eccentric means, polygonal piston means rotatably supported on said eccentric means and provided with piston recess means in the piston flanks thereof, said housing means being provided within one of said zones with gas exchange channel means, said piston means during movement thereof relative to said casing means and to the eccentric shaft means sliding with the corners thereof along the inner casing surfaces and thereby valving said gas exchange channel means, the piston recess means in each piston flank being constructed approximately axially symmetrical, and inlet groove means in a respective piston flank tangentially connected with the corresponding piston recess means, said inlet groove means beginning in relation to the direction of rotation of the piston means within the area of the trailing piston corner and having a depth increasing continuously from the beginning thereof toward the recess means and corresponding substantially to the depth of the piston recess means at the place of connection therewith.

said piston means being provided substantially concentrically with a raised portion whose highest point extends substantially up to the plane of the respective piston flank.

3. A rotary piston internal combustion engine according to claim 2 wherein said raised portion is of substantially conical shape.

4. A rotary piston internal combustion engine according to claim 2 wherein said raised portion is of substantially mushroom-like shape.

5. A rotary piston internal combustion engine, especially of trochoidal construction, comprising:

housing means having lateral housing parts and casing means provided with multi-arched internal surfaces forming zones in proximity to the axis of the engine, eccentric shaft means having eccentric means, polygonal piston means rotatably supported on said eccentric means and provided with piston recess means in the piston flanks thereof, said housing means being provided within one of said zones with gas exchange channel means, said piston means during movement thereof relative to said casing means and to the eccentric shaft means sliding with the corners thereof along the inner casing surfaces and thereby valving said gas exchange channel means, the piston recess means in each piston flank having circular wall means, and inlet groove means in a respective piston flank tangentially connected with the said circular wall means of the corresponding piston recess means, said inlet groove means beginning in relation to the direction of rotation of the piston means within the area of the trailing piston corner and having a depth increasing continuously from the beginning thereof toward the recess means and corresponding substantially to the depth of the piston recess means at the place of connection therewith, and further groove means tangentially connected with said circular wall means of said piston recess means on the side thereof opposite the inlet groove means, said further groove means extending toward the leading piston corner in relation to the direction of the piston means.

6. A rotary piston internal combustion engine, especially of trochoidal construction, comprising:

housing means having lateral housing parts and casing means provided with multi-arched internal surfaces forming zones in proximity to the axis of the engine, eccentric shaft means having eccentric means, polygonal piston means rotatably supported on said eccentric means and provided with piston recess means in the piston flanks thereof, said housing means being provided within one of said zones with gas exchange channel means, said piston means during movement thereof relative to said casing means and to the eccentric shaft means sliding with the corners thereof along the inner casing surface and thereby valving said gas exchange channel means, the piston recess means in each piston flank having circular wall means, and inlet groove means tangentially connected with said circular wall means of said piston recess means, the inlet groove means beginning in relation to the direction of rotation of the piston means within the area of the trailing piston corner and having a depth increasing continuously from the beginning thereof toward the recess means and corresponding substantially to the depth of the piston recess means at the place of connection therewith, said piston recess means being arranged in a respective piston flank eccentrically with respect to the axial direction of the piston means.

7. A rotary piston internal combustion engine, especially of trochoidal construction, comprising:

housing means having lateral housing parts and casing means provided with multi-arched internal surfaces forming zones in proximity to the axis of the engine, eccentric shaft means having eccentric means, polygonal piston means rotatably supported on said eccentric means and provided with piston recess means in the piston flanks thereof, said housing means being provided within one of said zones with gas exchange channel means, said piston means during movement thereof relative to said casing means and to the eccentric shaft means sliding with the corners along the inner casing surface and thereby valving said gas exchange channel means, the piston recess means in each piston flank having circular wall means, and inlet groove means tangentially connected with said circular wall means of said piston recess means, the inlet groove means beginning in relation to the direction of rotation of the piston means within the area of the trailing piston corner and having a depth increasing continuously from the beginning thereof toward the recess means and corresponding substantially to the depth of the piston recess means at the place of connection therewith, said piston recess means being arranged in a respective piston flank eccentrically with respect to the direction of rotation of the piston means.

8. A rotary piston internal combustion engine, especially of trochoidal construction, comprising:

housing means having lateral housing parts and casing means provided with multi-arched internal surfaces forming zones in proximity to the axis of the engine, eccentric shaft means having eccentric means, polygonal piston means rotatably supported on said eccentric means and provided with piston recess means in the piston flanks thereof, said housing means being provided within one of said zones with gas exchanges channel means, said piston means during movement thereof relative to said casing means and to the eccentric shaft means sliding with the corners along the inner casing surface and thereby valving said gas exchange channel means, the piston recess means in each piston flank having a circular wall means, and inlet groove means tangentially connected with said circular wall means of said piston recess means, the inlet groove means beginning in relation to the direction of rotation of the piston means within the area of the trailing piston corner and having a depth increasing continuously from the beginning thereof toward the recess means and corresponding substantially to the depth of the piston recess means at the place of connection therewith, said piston recess means being arranged in a respective piston flank eccentrically with respect to the axial direction of the piston means and the direction of rotation of the piston means.

9. A rotary piston internal combustion engine, especially of trochoidal construction, comprising:

housing means having lateral housing parts and casing means provided with multi-arched internal surfaces forming zones in proximity to the axis of the engine, eccentric shaft means having eccentric means, polygonal piston means rotatably supported on said eccentric means and provided with piston recess means in the piston flanks thereof, said housing means being provided within one of said zones with gas exchange channel means, said piston means during movement thereof relative to said casing means and to the eccentric shaft means sliding with the corners thereof along the inner casing surfaces and thereby valving said gas exchange channel means, the piston recese means in each piston flank being constructed approximately axially symmetrical, and inlet groove means in a respective piston flank tangentially connected with the corresponding piston recess means, said inlet groove means beginning in relation to the direction of rotation of the piston means within the area of the trailing piston corner and having a depth increasing continuously from the beginning thereof toward the recess means and corresponding substantially to the depth of the piston recess means at the place of connection therewith, said piston recess means being provided substantially concentrically with a raised portion whose highest point extends substantially up to the plane of the respective piston flank, and further groove means connected tangentially with said piston recess means on the side thereof opposite the inlet groove means, said further groove means extending toward the leading piston corner in relation to the direction of the piston means.

10. In a rotary piston internal combustion engine, especially of trochoidal construction in which a polygonal piston having piston flanks is rotatably supported on the eccentric of an eccentric shaft within a housing having multi-arched internal surfaces that includes zones close to the axis of the engine, and in which the piston during its movements relative to the enclosure body and the eccentric shaft slides with the piston corners thereof along the internal surfaces and thereby valves the gas exchange channels arranged in the housing within the area of one of said zones, the improvement essentially consisting of each piston flank being provided with circular recess means and with guide means guiding the combustion air into a respective circular recess means so as to produce a vortexing movement therein, said guide means comprising inlet groove means communicating with said circular recess means tangentially thereof.

11. In a rotary piston internal combustion engine, especially of trochoidal construction in which a polygonal piston having piston flanks is rotatably supported on the eccentric of an eccentric shaft within a housing having multi-arched internal surfaces that include zones close to the axis of the engine, and in which the piston during its movements relative to the enclosure body and the eccentric shaft slides with the piston corners thereof along the internal surfaces and thereby valves the gas exchange channels arranged in the housing within the area of one of said zones, the improvement essentially consisting of each piston flank being provided with circular recess means and with guide means guiding the combustion air into a respective circular recess means so as to produce a vortexing movement therein, said guide means including groove means beginning in relation to the direction of rotation of the piston in the area of the trailing piston corner and the depth of said first-mentioned groove means increasing continuously in the direction toward the respective recess means, said groove means communicating with said circular recess means and being in tangential relationship with the latter means.

12. In a rotary piston internal combustion engine, especially of trochoidal construction in which a polygonal piston having piston recesses in the piston flanks thereof is rotatably supported on the eccentric of an eccentric shaft within a housing having multi-arched internal surfaces that include zones close to the axis of the engine, and in which the piston during its movements relative to the enclosure body and the eccentric shaft slides with the piston corners thereof along the internal surfaces and thereby valves the gas exchange channels arranged in the housing within the area of one of said zones, the improvement essentially consisting of each piston flank being provided with recess means and with guide means guiding the combustion air into a respective recess means so as to produce a vortexing movement therein, said guide means including groove means beginning in relation to the direction or rotation of the piston in the area of the trailing piston corner and the depth of said first-mentioned groove means increasing continuously in the direction toward the respective recess means a substantially centrally located projection in each recess means and further groove means beginning in a respective leading piston corner and increasing continuously in depth in the direction toward the respective recess means.

13. In a rotary piston internal combustion engine, especially of trochoidal construction in which a polygonal piston having piston recesses in the piston flanks thereof is rotatably supported on the eccentric of an eccentric shaft within a housing having multi-arched internal surfaces that include zones close to the axis of the engine, and in which the piston during its movements relative to the enclosure body and the eccentric shaft slides with the piston corners thereof along the internal surfaces and thereby valves the gas exchange channels arranged in the housing within the area of one of said zones, the improvement essentially consisting of each piston flank being provided with recess means of substantially axially symmetrical shape and with guide means guiding the combustion air into a respective recess means so as to produce a vortexing movement therein said guide means including groove means beginning in relation to the direction of rotation of the piston in the area of the trailing piston corner and the depth of said first-mentioned groove means increasing continuously in the direction toward the respective recess means, a substantially centrally located projection in each recess means and further groove means beginning in a respective leading piston corner and increasing continuously in depth in the direction toward the respective recess means.

14. A rotary piston internal combustion engine, especially of trochoidal construction, comprising:

housing means having internal surface means, polygonal piston means rotatably supported in said housing means and sliding with its piston corners during movement thereof relative to said housing means along the internal surface means to effectively provide suction, compression and expansion spaces formed between the piston means and the internal surface means, and means for supplying combustion air to the combustion space including recess means and guide means in a respective piston flank for imparting to said combustion air a strongly vortexing movement lasting at least up to the ignition moment, said recess means comprising a circular depression in a respective piston flank having a central projection, said guide means comprising groove means in a respective piston flank leading into said circular depression and being in tangential relationship with said depression.

References Cited by the Examiner

UNITED STATES PATENTS 3,213,836  10/1965  Keylwert et al. -------- 123—8

MARK NEWMAN, *Primary Examiner.*

F. T. SADLER, *Assistant Examiner.*